United States Patent
Dornhof

(10) Patent No.: US 7,586,276 B2
(45) Date of Patent: Sep. 8, 2009

(54) ELECTRONICALLY COMMUTATED MOTOR AND METHOD FOR CONTROLLING THE SAME

(75) Inventor: Konstantin Dornhof, Immendingen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 293 days.

(21) Appl. No.: 10/597,585

(22) PCT Filed: Dec. 28, 2004

(86) PCT No.: PCT/EP2004/014759

§ 371 (c)(1), (2), (4) Date: Jul. 31, 2006

(87) PCT Pub. No.: WO2005/076456

PCT Pub. Date: Aug. 18, 2005

(65) Prior Publication Data

US 2008/0258659 A1    Oct. 23, 2008

(30) Foreign Application Priority Data

Feb. 3, 2004   (DE) ................ 10 2004 006 449

(51) Int. Cl.
   *H02P 6/00* (2006.01)
(52) U.S. Cl. .............. 318/400.1; 318/400.24; 318/400.17; 318/400.4; 318/700
(58) Field of Classification Search .......... 318/400.1, 318/400.17, 400.24, 700
   See application file for complete search history.

(56) References Cited

U.S. PATENT DOCUMENTS

| | | | | |
|---|---|---|---|---|
| 4,686,436 A | * | 8/1987 | Archer | 318/400.26 |
| 4,859,921 A | * | 8/1989 | Archer | 318/599 |
| 4,922,169 A | * | 5/1990 | Freeman | 318/400.1 |
| 4,943,760 A | * | 7/1990 | Byrne et al. | 318/701 |
| 5,023,527 A | * | 6/1991 | Erdman et al. | 318/400.34 |
| 5,030,897 A | * | 7/1991 | Ohtani et al. | 318/139 |
| 5,081,409 A | * | 1/1992 | Goff | 318/811 |

(Continued)

FOREIGN PATENT DOCUMENTS

DE    31 06 856 A    12/1981

(Continued)

OTHER PUBLICATIONS

Tietze & Schenk, Halbleiter-Schaltungstechnik [Semiconductor Circuit Technology], 11$^{th}$ Ed. pp. 311, 446-447, 818, 821-823. ISBN 3-540-42849-6, copyright19992, Springer, Berlin-Heidelberg-New York.

*Primary Examiner*—Rita Leykin
(74) *Attorney, Agent, or Firm*—Milton Oliver, Esq.; Oliver Intellectual Property LLC

(57) ABSTRACT

The invention relates to an electronically commutated motor (10) and to a method of controlling an electronically commutated motor (10). In order to reduce commutation noise, it is proposed to influence the working range of the power-stage transistors (20, 22) with the aid of a component (48), in such a way that each transistors produces, during energization of each respective stator winding, a substantially constant current through the stator winding (12, 14). Preferably, each power-stage transistor operates within a pinch-off range.

14 Claims, 5 Drawing Sheets

U.S. PATENT DOCUMENTS

| | | | |
|---|---|---|---|
| 5,191,269 A | 3/1993 | Carbolante | 318/254 |
| 5,374,857 A | 12/1994 | Carobolante | 327/110 |
| 5,886,487 A * | 3/1999 | Khayat et al. | 318/400.27 |
| 5,901,268 A * | 5/1999 | Ando et al. | 388/811 |
| 5,939,863 A | 8/1999 | Miller | 320/136 |
| 6,020,715 A | 2/2000 | Yasohara et al. | 318/808 |
| 6,278,251 B1 | 8/2001 | Schöb | 318/293 |
| RE37,360 E * | 9/2001 | Duncan | 318/281 |
| 6,353,354 B1 * | 3/2002 | Detweiler et al. | 327/423 |
| 6,377,109 B1 | 4/2002 | Yama | 327/423 |
| 6,731,082 B2 * | 5/2004 | Pelonis | 318/400.26 |
| 6,864,649 B2 * | 3/2005 | Krueger | 318/400.01 |
| 6,995,534 B2 * | 2/2006 | Berroth et al. | 318/400.22 |
| 2004/0056617 A1 * | 3/2004 | Berroth et al. | 318/439 |

FOREIGN PATENT DOCUMENTS

| | | |
|---|---|---|
| DE | 43 39 195 | 5/1994 |
| DE | 198 03 040 A | 8/1998 |
| EP | 0 572 162 | 12/1993 |
| EP | 0 892 492 A1 | 1/1999 |
| EP | 0 986 167 A3 | 8/1999 |
| EP | 0 989 656 A | 3/2000 |
| GB | 2 071 440 A | 9/1981 |

* cited by examiner

ELECTRONICALLY COMMUTATED MOTOR AND METHOD FOR CONTROLLING THE SAME

CROSS-REFERENCE

This application is a section 371 of PCT/EP2004/014759, filed 28 Dec. 2004, published 18 Aug. 2005 as WO 2005/076 456-A1. It also claims priority from German application DE 10 2004 006 449.0, filed 3 Feb. 2004, the entire content of which is hereby incorporated by reference.

FIELD OF THE INVENTION

The invention relates to an electronically commutated motor and to a method for controlling an electronically commutated motor.

BACKGROUND

With such motors, the occurrence of commutation noise is problematic for a number of applications. A number of suggested solutions to this are known from the existing art. A characteristic common to all the suggested solutions is that they are very complex and cost-intensive.

SUMMARY OF THE INVENTION

It is the object of the present invention to reduce commutation noise. This object is achieved by a motor in which a respective field-effect transistor (FET) controls the current through each stator winding phase, and a further component influences the working range of the FET to make the current through the winding phase substantially current while that phase is energized. In a preferred method, the FET is operated as a pinch-off current source.

The invention is based on the recognition that low-noise commutation can be achieved by means of a current through the stator winding that is substantially constant at least during the on-time of the stator winding. A basic idea of the invention is therefore to influence the working range of the field-effect transistor associated with the stator winding in such a way that the transistor generates, during the respective energization, a substantially constant current through the stator winding. A component configured for the purpose is provided therefor.

According to a preferred embodiment of the invention, the component is configured in such a way that the field-effect transistor is operated as a pinch-off current source.

In a further preferred embodiment of the invention, the component comprises a transistor. In other words, the field-effect transistor associated with the stator winding is shifted into the pinch-off region with the aid of a further transistor. This further transistor is preferably controlled by means of a variable resistor or by means of a microcontroller. This control action results in a change in the conductivity of the transistor, which results in a displacement of the working point into the desired region. The control action on the transistor modifies the current intensity through the stator winding, and thus the rotation speed of the motor.

In a further embodiment of the invention, provision is made to continuously keep the current in the stator winding substantially constant during operation of the motor.

As compared with known suggested solutions, the present invention enables low-noise commutation with a comparatively small outlay of material, and using a comparatively simple circuit. The invention is not limited to a specific type of motor.

BRIEF FIGURE DESCRIPTION

Further details and advantageous refinements of the invention are evident from the exemplifying embodiments described below and depicted in the drawings, in which.

Figure 3:
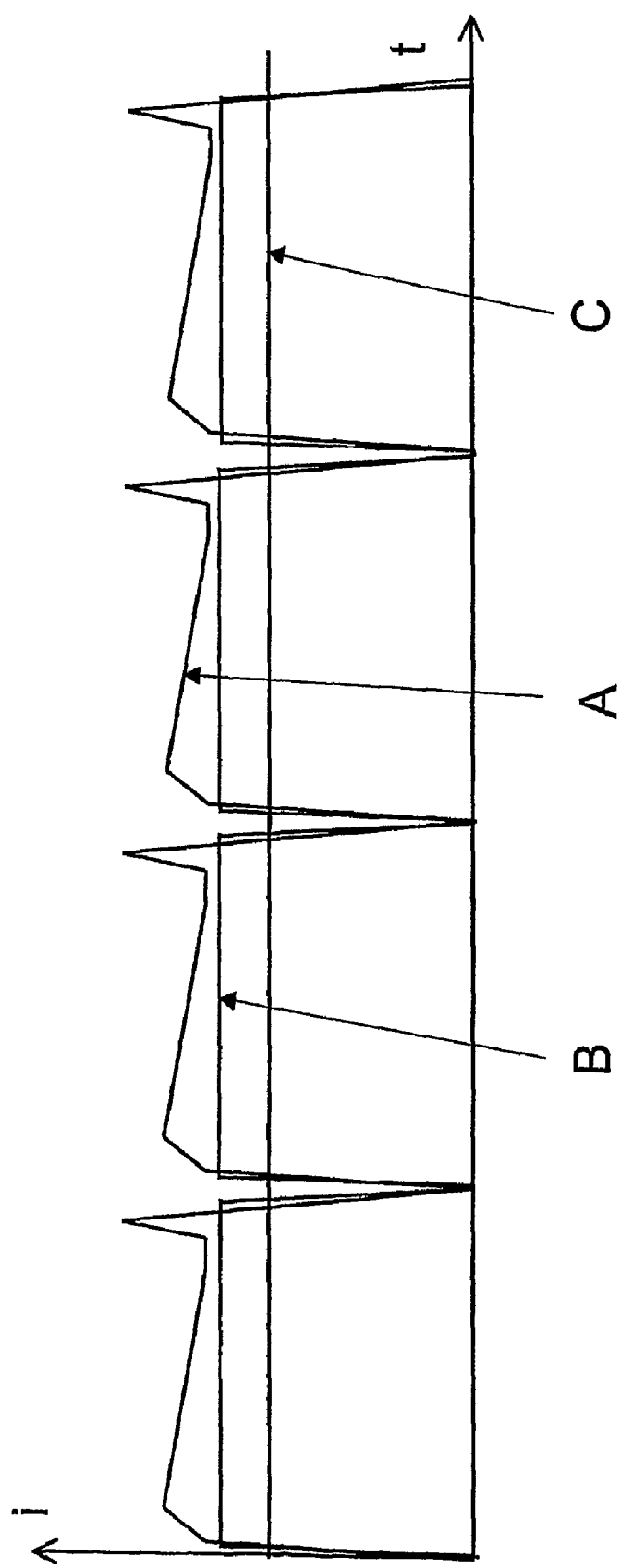
Figure 4:
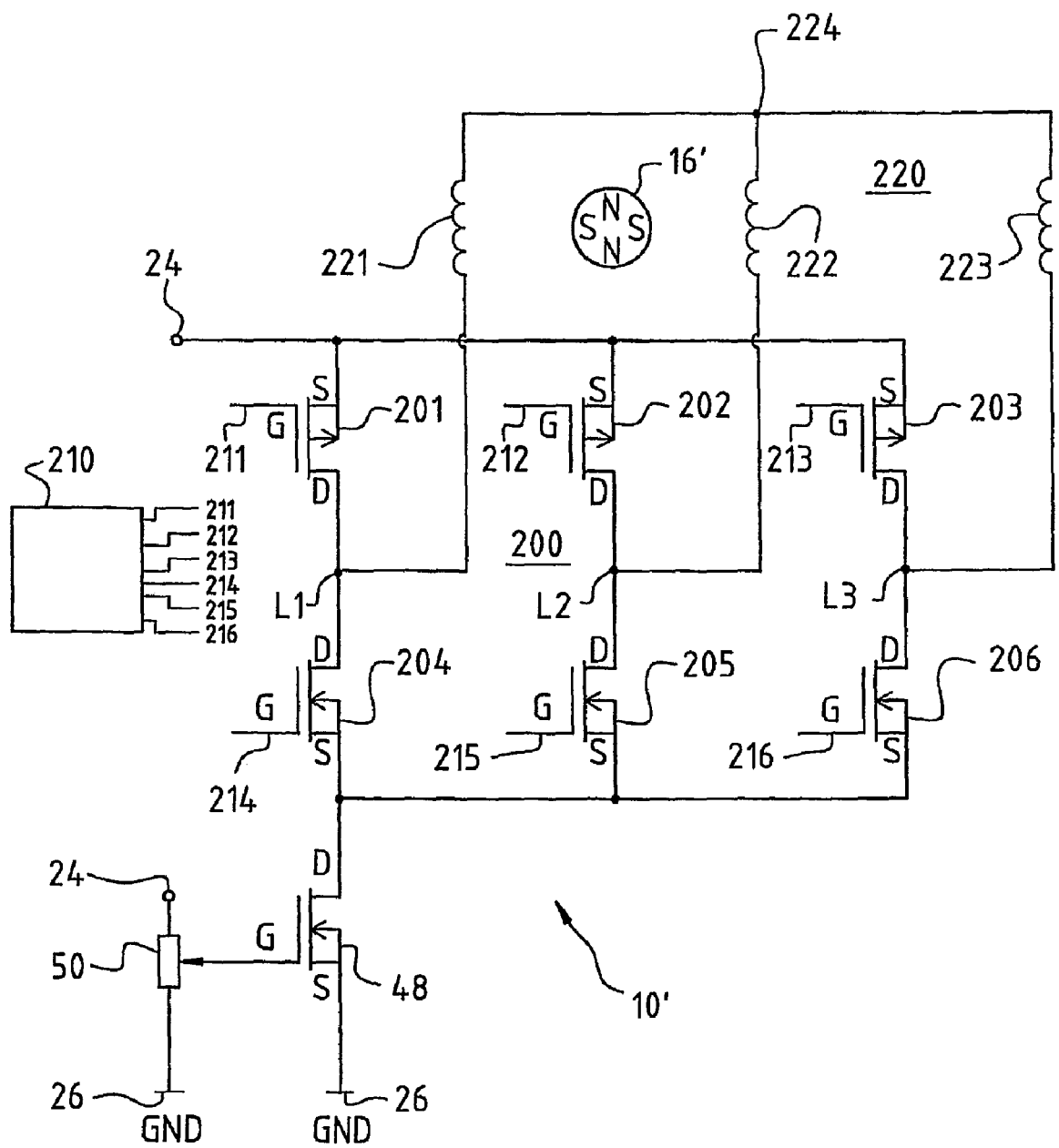
Figure 5:
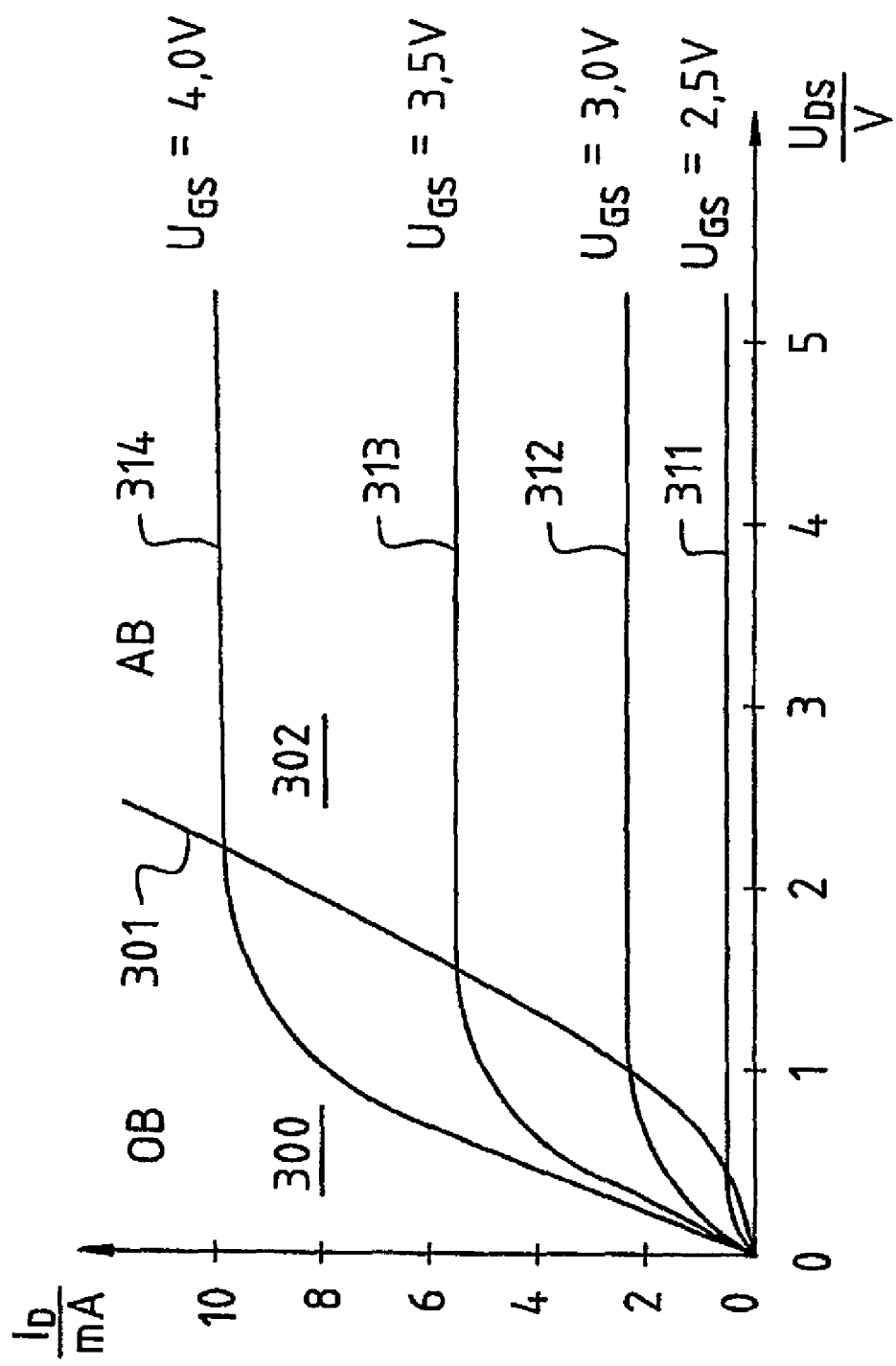

FIG. 3 schematically depicts the commutation current through a stator winding according to the existing art (curve A) and according to embodiments of the invention (curves B and C);

FIG. 4 is a greatly simplified circuit diagram of an electronically commutated motor according to a third embodiment of the invention; and FIG. 5 shows a family of characteristic curves of an n-channel field-effect transistor.

DETAILED DESCRIPTION

Figure 1:
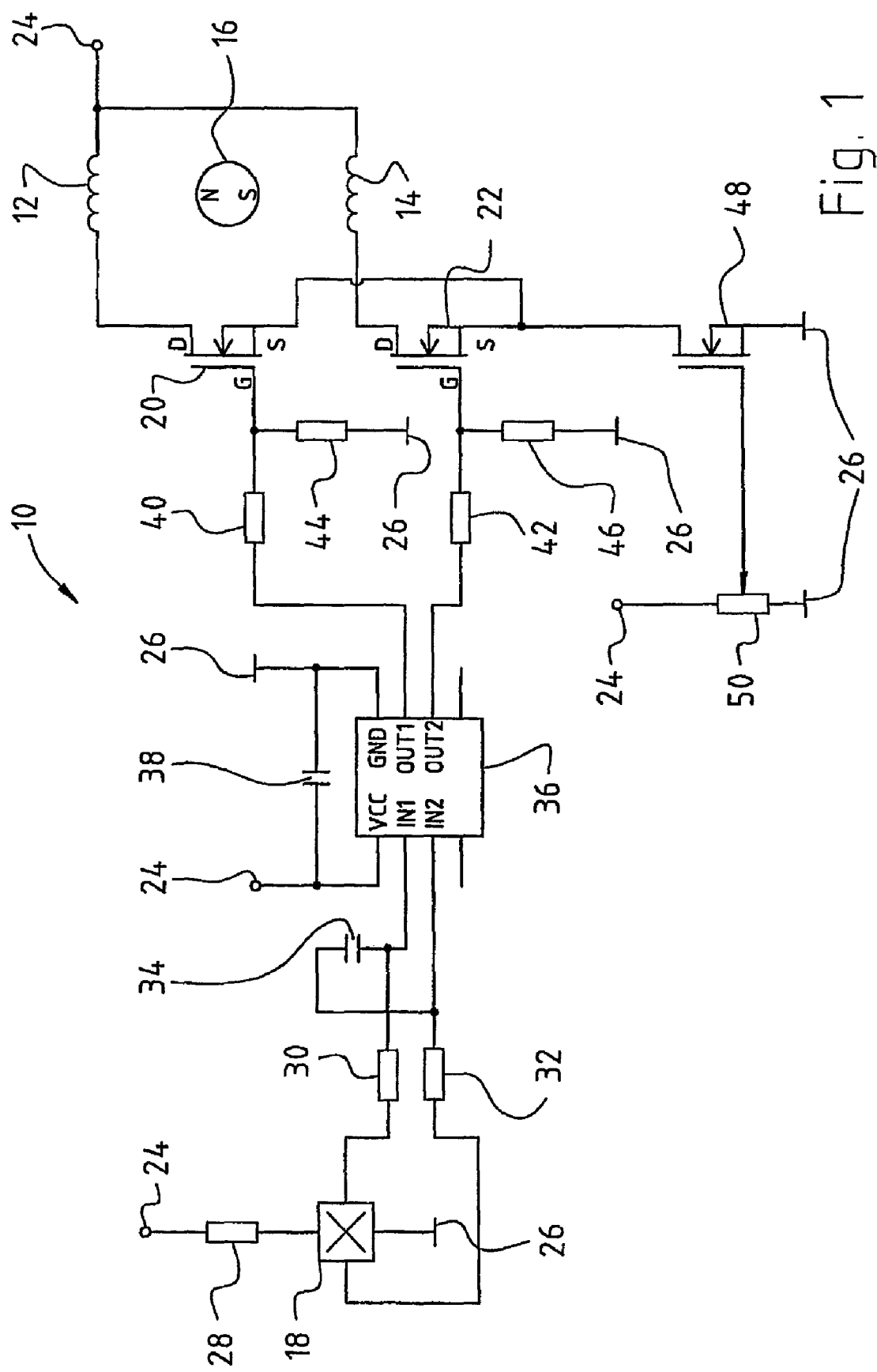
FIG. 1 is a greatly simplified circuit diagram of an electronically commutated motor according to a first embodiment of the invention.

FIG. 1 is an exemplary depiction of a two-phase electric motor that can be used with the present invention. The electronically commutated DC motor 10 comprises two stator winding phases 12, 14 and a permanent-magnet rotor 16 (depicted merely symbolically). Arranged in the vicinity of rotor 16 is a Hall sensor 18. For reasons of clarity, the latter is illustrated at a different location in the present circuit diagram. Phase 12 is in series with a first power-stage transistor 20 (MOSFET), and phase 14 is in series with a second power-stage transistor 22 (MOSFET). Phases 12, 14 are connected to a positive lead 24. Positive lead 24 and negative lead 26 are connected, during operation, to a power supply (not depicted) or to a battery. Phases 12, 14 are usually coupled to one another in transformer fashion via the iron of the stator lamination stack.

Hall sensor 18 is connected on the one hand via a resistor 28 to positive lead 24, and on the other hand to negative lead 26. The output signal of Hall sensor 18 is delivered, through resistors 30, 32 and a capacitor 34, to the two inputs IN1 and IN2 of a microcontroller (μC) 36. μC 36 is connected at its terminal VCC to positive lead 24, and at its terminal GND to negative lead 26. A storage capacitor 38 is arranged between positive lead 24 and negative lead 26. μC 36 generates signals OUT1 and OUT2 to control power-stage transistors 20, 22, and at the same time provides stalling protection for motor 10. The control signals are generated by means of a program routine or control routine executing in μC 36. Signal OUT1 is delivered through a resistor 40 to the gate of power-stage transistor 20. In the same fashion, signal OUT2 is delivered through a resistor 42 to the gate of power-stage transistor 22. The gate of power-stage transistor 20 is connected via a resistor 44 to negative lead 26.

In the same fashion, the gate of power-stage transistor 22 is connected via a resistor 46 to negative lead 26.

Source terminals S of power-stage transistors 20, 22 are connected via a control transistor 48 (MOSFET) to negative lead 26. Gate G of control transistor 48 is connected to a variable resistor 50 that is arranged between positive lead 24 and negative lead 26. According to the present invention, power-stage transistors 20, 22 are respectively controlled in the source region by control transistor 48 in such a way that the current through stator windings 12, 14 is substantially constant at least during commutation. For that purpose, power-stage transistors 20, 22 are operated as a pinch-off current source (cf. Tietze/Schenk, Halbleiter-Schaltungstechnik [Semiconductor Circuit Engineering], 12th ed., pp. 411 ff.). For example, when power-stage transistor 20 is controlled by control signal OUT1, control transistor 48 acts as a resistance with respect to ground. In this embodiment of the invention, the current intensity through stator windings 12, 14, and thus the rotation speed of motor 10, can be adjusted by means of variable resistor 50 at the gate of control transistor 48. This embodiment is especially suitable for those applications in which a change in motor rotation speed during operation is not necessary.

FIG. 5 shows a family of output characteristic curves of an n-channel field-effect transistor, which family has four characteristic curves 311, 312, 313, and 314. The drain current $I_D$ is plotted for four different gate-source voltages $U_{GS}$=2.5 V, 3.0 V, 3.5 V, and 4.0 V as a function of drain-source voltage $U_{DS}$. The family of characteristic curves displays an ohmic region (triode region) OB 300 in which characteristic curves 311 to 314 extend, at the origin $U_{DS}$=0 V, almost linearly through the origin, yielding a behavior similar to that of an ohmic resistor.

In addition to ohmic region OB 300, there is a so-called pinch-off region AB 302 in which characteristic curves 311 to 314 exhibit an almost constant drain current $I_D$. A line 301 marks the boundary between ohmic region OB 300 and pinch-off region AB 302.

What is achieved by way of control transistor 48 of FIG. 1 is that drain-source voltage $U_{DS}$ is modified, and the magnitude of the current (i) through stator winding 12 is thus also influenced. Because boundary 301 between ohmic region OB 300 and pinch-off region AB 302 is likewise dependent on drain-source voltage $U_{DS}$, what is also achieved, if applicable, is that transistors 20, 22 operate in the pinch-off region.

All types of field-effect transistors exhibit a pinch-off region of this kind.

Figure 2:
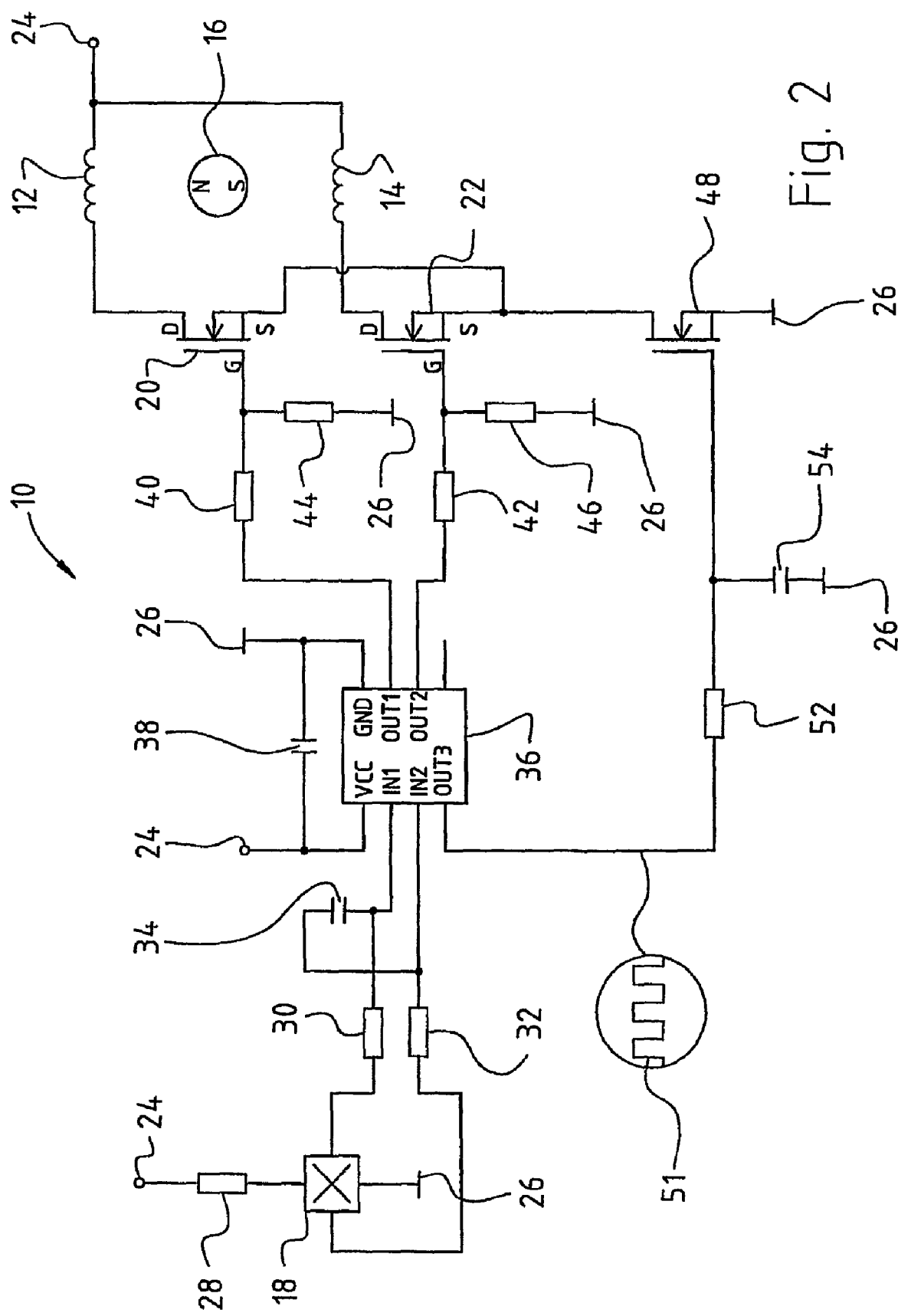
FIG. 2 is a greatly simplified circuit diagram of an electronically commutated motor according to a second embodiment of the invention.

FIG. 2 is the circuit diagram of a motor 10 according to the present invention in a second embodiment, in which the motor rotation speed can be controlled without difficulty.

For this variable control function, gate G of control transistor 48 is connected to output OUT 3 of a μC 36 via a low-pass filter constituted by a resistor 52 and a capacitor 54. The low-pass filter converts the digital control signals 51 of μC 36 into an analog voltage signal whose magnitude is dependent on the pulse duty factor of control signals 51. The remainder of the circuit arrangement corresponds to that of FIG. 1. Appropriate control applied to control transistor 48 ensures that the current through stator windings 12, 14 is substantially constant. Modification of the conductivity of control transistor 48, and thus a modification of the motor rotation speed, are accomplished in accordance with the program routines or control routines executing in μC 36.

When control transistor 48 is controlled in such a way that it exhibits a high resistance and thus poor conductivity, the potential at the source of the respective power-stage transistor 20, 22 rises. Less current flows through power-stage transistor 20, 22, and it transitions into the pinch-off region.

When power transistor 48 is controlled in such a way that it exhibits a low resistance and thus high conductivity, the potential present at the source of the respective power-stage transistor 20, 22 is low. The high gate-source voltage associated therewith results in a correspondingly high current intensity in stator winding 12, 14.

As depicted in FIG. 3, a smoothing of the current curve is achieved with the present invention. In contrast to conventional commutation methods (curve A), according to the present invention the current through a stator winding is kept substantially constant either during energization (curve B) or throughout the entire operating period of the motor (curve C).

FIG. 4 shows an exemplifying embodiment according to the present invention of a full-bridge circuit for a three-phase electronically commutated motor 10'.

Identical or identically functioning components are labeled with the same reference characters and will not be explained again.

Stator 220 comprises three winding phases 221, 222, 223 in a wye configuration, which are connected between a neutral point 224 and winding terminals L1, L2, and L3.

Power stage 200 is implemented as a full bridge, and comprises three upper transistors 201, 202, 203 that are connected between positive lead 24 and respective winding terminals L1, L2, and L3; as well as three lower transistors 204, 205, 206 that are connected between respective winding terminals L1, L2, and L3 and control transistor 48.

Gate terminals G of power-stage transistors 201 to 206 are controlled by a power-stage control system 210 via terminals 211 to 216.

Control transistor 48 is adjusted in such a way that lower transistors 204, 205, 206 each operate in the pinch-off region.

Commutation is accomplished by means of control input to power-stage transistors 211 to 216, and therefore to winding terminals L1, L2, L3, as a function of the position of rotor 16'.

In a preferred embodiment, the respective upper transistors 201, 202, 203 or lower transistors 204, 205, 206 are made conductive for the entire commutation period. In a further preferred embodiment, commutation off-times are provided upon a change in energization in order to prevent short-circuiting. It is additionally possible to control upper transistors 201, 202, 203 using a clock-timed control signal 201, 202, 203.

Numerous variants and modifications are of course possible within the scope of the present invention.

What is claimed is:

1. An electronically commutated motor (10) comprising
   a permanent-magnet rotor (16) and a stator having at least one stator winding (12, 14);
   a microcontroller (36) for generating at least one commutation signal (OUT1, OUT2) for switching the current (I) in said at least one stator winding (12, 14) on and off; and
   a device (36) for generating at least one second signal (51) to influence the magnitude of the current (I) that flows, during operation, through that stator winding (12, 14) when and if switched on by the commutation signal (OUT1, OUT2);
   a first field-effect transistor (22), connected in series with the associated stator winding (14), and to whose gate (G) the commutation signal (OUT2) is applied, via a voltage divider (42, 46),
   wherein a resistance (46) of that voltage divider (42, 46) is arranged between that gate (G) and a point (26) having a predetermined electrical potential; and
   a second field-effect transistor (48), arranged between the source (S) of the first field-effect transistor (22) and said point (26) having the predetermined electrical potential, and to whose gate (G) the second signal (51) is applied, to modify the voltage drop ($U_{DS}$) at the second field-effect transistor (48) as a function of said second signal (51), in order to influence a pinch-off voltage ($U_{GS}$) of the first field-effect transistor (22).

2. The motor according to claim 1, wherein
the second field-effect transistor (48) is configured to influence the working range of the first field-effect transistor (22) in such a way that the latter produces, during the respective energization, a substantially constant current (I) through the associated stator winding (14).

3. The motor according to claim 2, wherein
the second field-effect transistor (48) is configured to operate the first field-effect transistor (22) as a pinch-off current source.

4. The motor according to claim 3, further comprising
a variable resistor (50) exerting control on the second field-effect transistor (48).

5. The motor according to claim 1, wherein said second-signal-generating device (36) is configured for exerting control on the second field-effect transistor (48).

6. The motor according to claim 1, wherein the second signal is a digital control signal (51) having a pulse duty cycle that controls the voltage drop ($U_{DS}$) at the second field-effect transistor (48).

7. The motor according to claim 6, wherein
the digital control signal (51) is supplied to the second field-effect transistor (48) as a smoothed signal.

8. The motor according to claim 6, further comprising
a low-pass filter (52, 54) arranged in-between the device (36) and the gate (G) of the second field-effect transistor (48), the low-pass filter (52, 54) being configured to smooth the digital control signal (51).

9. The motor according to claim 1, wherein
a plurality of stator windings (12, 14) are provided, each having an associated field-effect transistor (20, 22), the gate (G) of which is supplied with an associated commutation signal (OUT1, OUT2) provided by the device (36) for switching the current through the respective stator winding (12, 14) on and off, and
wherein the second field-effect transistor (48) is arranged between the source terminals (S) of the first mentioned field-effect transistors (20, 22) and said point (26) having a predetermined electrical potential.

10. The motor according to claim 1, wherein
the device (36) for generating the at least one second signal (51) is implemented as a microcontroller (36).

11. A method of controlling an electronically commutated motor (10), having a permanent-magnet rotor (16) and a stator having at least one stator winding (12, 14), a microcontroller (36) for generating at least one commutation signal (OUT1, OUT2) for switching current (I) in that stator winding (12, 14) on and off, and a device (36) for generating at least one second signal (51) for influencing the magnitude of current (I) that flows, during operation, through that stator winding (12, 14), when and if switched on by the commutation signal (OUT1, OUT2), a first field-effect transistor (22) and a second field-effect transistor (48), the first field-effect transistor (22) being connected in series with the associated stator winding (14) and having a gate (G) that is connected to a resistance (46) of a voltage divider (42, 46) arranged between that gate (G) and a point (26) having a predetermined electrical potential, and the second field-effect transistor (48) being arranged between the source (S) of the first field-effect transistor (22) and the point (26) having the predetermined electrical potential, the method comprising the steps of:
supplying the commutation signal (OUT2) via the voltage divider (42, 46) to the gate (G) of the first field-effect transistor (22); and
supplying the second signal (51) to the gate (G) of the second field-effect transistor (48), to modify the voltage drop ($U_{DS}$) at the second field-effect transistor (48) as a function of that second signal (51), in order to influence the pinch-off voltage ($U_{GS}$) of the first field-effect transistor (22).

12. The method according to claim 11, wherein said step of influencing the pinch-off voltage ($U_{GS}$) of the first field-effect transistor (22) comprises influencing the working range of the first field-effect transistor (22) in such a way that the latter produces, during the respective energization, a substantially constant current (I) through the associated stator winding (14).

13. The method according to claim 12, wherein
influencing the pinch-off voltage ($U_{GS}$) of the first field-effect transistor (22) comprises operating the first field-effect transistor (22) as a pinch-off current source.

14. The method according to claim 11, further comprising:
smoothing the second signal (51) using a low-pass filter (52, 54) arranged between the device (36) and the gate (G) of the second field-effect transistor (48).

* * * * *